(12) United States Patent
Wang

(10) Patent No.: US 10,540,331 B2
(45) Date of Patent: Jan. 21, 2020

(54) HIERARCHICALLY STORED DATA PROCESSING

(71) Applicant: SAP SE, Walldorf (DE)

(72) Inventor: Kefeng Wang, Wiesloch (DE)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 15/363,326

(22) Filed: Nov. 29, 2016

(65) Prior Publication Data

US 2018/0150478 A1 May 31, 2018

(51) Int. Cl.
G06F 7/00 (2006.01)
G06F 17/30 (2006.01)
G06F 16/185 (2019.01)

(52) U.S. Cl.
CPC ................. G06F 16/185 (2019.01)

(58) Field of Classification Search
CPC ......... G06F 17/30368; G06F 17/30144; G06F 17/30221; G06F 16/185; G06F 16/2358
USPC ................. 707/736, 737, 792, 753
See application file for complete search history.

(56) References Cited

U.S. PATENT DOCUMENTS

| 6,480,857 | B1* | 11/2002 | Chandler | .......... | G06F 17/30595 |
| | | | | | 707/792 |
| 6,925,476 | B1 | 8/2005 | Multer et al. | | |
| 7,076,508 | B2 | 7/2006 | Bourbonnais et al. | | |
| 7,743,029 | B2 | 6/2010 | Frey | | |
| 8,301,601 | B2 | 10/2012 | Suzuki | | |
| 9,063,980 | B2 | 6/2015 | Dhamankar et al. | | |
| 9,116,906 | B2 | 8/2015 | Nos | | |
| 2003/0055809 | A1 | 3/2003 | Bhat | | |
| 2011/0016347 | A1* | 1/2011 | Brodeur | ................ | G06F 11/327 |
| | | | | | 714/2 |
| 2014/0324778 | A1* | 10/2014 | Bonnell | ............ | G06F 17/30575 |
| | | | | | 707/634 |

OTHER PUBLICATIONS

Brunel et al., "Supporting Hierarchical Data in SAP HANA," Technische Universität München, Garching, Germany (2015).

* cited by examiner

*Primary Examiner* — Md I Uddin
(74) *Attorney, Agent, or Firm* — Jones Day

(57) ABSTRACT

Methods and systems are described for receiving data including a hierarchy change log comprising change records specifying changes made to hierarchical data. The hierarchical data includes hierarchically arranged nodes. Change records are grouped according to a key corresponding to each record. Using a record consolidation algorithm, a consolidated view of the hierarchy change log is generated. A consolidated view can be generated by sorting, for each group, the change records into an ascending temporal order based on their respective timestamps to form a sequence of change records. The consolidated view is then displayed on an electronic visual display. Related apparatus, systems, techniques and articles are also described.

16 Claims, 6 Drawing Sheets

300

Group all change log by key (parent, child)

For each group sort by timestamp ascending, take the first record t1, and merge it with next record t2 by following rule, \*t1_Delete(old:pred1,) + t2_Insert(new:pred2) = if pred1≠ pred2 then = t1_Change(new:pred2)

if pred1 = pred2 then = Φ

\*t1_Insert(new:pred1) + t2_Delete(old:pred1) = Φ

\*t1_Insert(new:pred1) + t2_Change(old:null, new:pred2) = t1_Insert(new:pred2)

\*t1_Change(old:null, new:pred1) + t1_Insert(new:pred2) = t1_Insert(new:pred1)

\*t1_Change(old:pred1, new:pred2) + t2_Change(old: pred2, new:pred1) = Φ

\*t1_Change(old:pred1, new:pred2) + t2_Change(old:pred2, new:pred3) = t1_Change(old:pred1, new:pred3)

and the result is named again as t1, and take 3rd record as t2 to merge following the same rule until last record of this group is merged, if the result is Φ, then take 3rd record as t1 and 4th record as t2 to merge

FIG. 3

Hierarchy Change Log 230

| TS | Parent | Child | Action | Old_Pred | New_Pred |
|----|--------|-------|--------|----------|----------|
| 1  | C      | D     | Delete |          | -        |
| 1  | B      | D     | Insert | -        | B1       |
| 1  | C      | C1    | Change | D        | -        |
| 1  | B      | B2    | Change | B1       | D        |
| 2  | B      | D     | Delete | B1       | -        |
| 2  | B      | B2    | Change | D        | B1       |
| 3  | A      | D     | Insert | -        | D        |
| 3  | A      | A1    | Change |          | B2       |
| 4  | B      | B1    | Change | B1       |          |
| 4  | B      | B2    | Change |          | -        |
| 5  | A      | D     | Delete | D        |          |
| 5  | A      | A1    | Change |          | -        |
| 5  | C      | D     | Insert | -        | C1       |

Grouped View 410

| TS | Parent | Child | Action | Old_Pred | New_Pred |
|----|--------|-------|--------|----------|----------|
| 1  | C      | D     | Delete |          | -        |
| 5  | C      | D     | Insert | -        | C1       |
| 1  | B      | D     | Insert | -        | B1       |
| 2  | B      | D     | Delete | B1       | -        |
| 1  | C      | C1    | Change | D        | -        |
| 1  | B      | B2    | Change | B1       | D        |
| 2  | B      | B2    | Change | D        | B1       |
| 4  | B      | B2    | Change | B1       |          |
| 3  | A      | D     | Insert | -        | D        |
| 5  | A      | D     | Delete | D        | -        |
| 3  | A      | A1    | Change |          | D        |
| 5  | A      | A1    | Change | D        | -        |
| 4  | B      | B1    | Change |          | B2       |

Consolidated View 420

| TS | Parent | Node | Action  | Old_Pred | New_Pred |
|----|--------|------|---------|----------|----------|
| 5  | C      | D    | Changed |          | C1       |
| 1  | C      | C1   | Change  | D        | -        |
| 4  | B      | B1   | Change  |          | B2       |
| 4  | B      | B2   | Change  | B1       |          |

FIG. 4

HIERARCHICALLY STORED DATA PROCESSING

TECHNICAL FIELD

The subject matter described herein relates to hierarchical data processing.

BACKGROUND

Hierarchal database structures can be used in various applications such as enterprise organization structures, master data structures, or product catalogs. Data records stored within the hierarchal database structures are organized based on hierarchical relationships with master data objects. Modification to data records stored within the hierarchal database structures creates corresponding change data logs. Each modification in turn increases the number of data records stored within the hierarchal database structure.

SUMMARY

In one aspect, a computer implemented method can be implemented by at least one data processor to receive data including a hierarchy change log. The hierarchy change log includes change records, each change record specifies one of many changes made to hierarchical data.

The hierarchical data is made up of hierarchically arranged nodes. Changes made to the hierarchical data can include, for example, inserting a new node, deleting a node, modifying a node, moving a node to depend from a different parent node, or moving a node to have a different child node.

The change records are grouped according to a key corresponding to each change record. The key can be a combination of an identification of a parent node and an identification of a child node.

Using a record consolidation algorithm, a consolidated view of the hierarchy change log is generated. The consolidated view includes a reduced number of change records for at least one of the groups of change records. A consolidated view can be generated by sorting, for each group, the change records into an ascending temporal order based on their respective timestamps to form a sequence of change records. The consolidated view is then displayed on an electronic visual display.

In some variations, the consolidated view can include graphical user interface elements corresponding to each change record, the selection of which can cause an unconsolidated view of the change records for the corresponding key to be displayed. The consolidated view can include graphical user interface elements corresponding to each change record, the selection of which indicates that the changes characterized by such change record have been approved.

In some variations, each change record for each group can be selectively merged in the sequence of change records with an immediately successive change record until only one change record remains for the group. In this case, the record consolidation algorithm can cancel out change records having changes that offset each other. The change record for each group can also be selectively merged in the sequence of change records with an immediately successive change record until only one change record remains for the group or there are no remaining change records.

In another aspect, an article of manufacture includes computer executable instructions stored on non-transitory computer readable media. Execution of the computer executable instruction by a computer causes the computer to perform operations including receiving data including a hierarchy change log. The hierarchy change log includes change records, each change record specifies one of many changes made to hierarchical data. The hierarchical data is made up of hierarchically arranged nodes. The change records are grouped according to a key corresponding to each record. Using a record consolidation algorithm, a consolidated view of the hierarchy change log is generated. The consolidated view includes a reduced number of change records for at least one of the groups of change records. A consolidated view can be generated by sorting, for each group, the change records into an ascending temporal order based on their respective timestamps to form a sequence of change records. The consolidated view is then displayed on an electronic visual display.

In yet another aspect, a system includes a computer, non-transitory computer readable media, and executable instructions stored on the non-transitory computer readable media. Execution of the computer executable instruction by a computer causes the computer to perform operations including receiving data including a hierarchy change log. The hierarchy change log includes change records, each change record specifies one of many changes made to hierarchical data. The hierarchical data includes hierarchically arranged nodes. The change records are grouped according to a key corresponding to each record. Using a record consolidation algorithm, a consolidated view of the hierarchy change log is generated. The consolidated view includes a reduced number of change records for at least one of the groups of change records. A consolidated view can be generated by sorting, for each group, the change records into an ascending temporal order based on their respective timestamps to form a sequence of change records. The consolidated view is then displayed on an electronic visual display.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One technical advantage includes a record consolidation algorithm for consolidating change data logs associated with hierarchical data. Implementation of the record consolidation algorithm reduces processing burdens by eliminating intermediate consolidation steps and focuses on changes from a previous approved hierarchal state The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is an example record consolidation algorithm;

FIG. 4 is a process flow diagram illustrating grouping and consolidation of change logs;

Like reference symbols in the various drawings indicate like elements.

DETAILED DESCRIPTION

A hierarchal change log can reflect data associated with user interaction via a user interface to visualize hierarchies. For example, swapping two items that are each connected to a different node of a hierarchal data record can require multiple user interactions in order to first move the items to an intermediate "parking position" in order to free up a previous position to make remove for a second item in that position. A change log can be stored for each intermediate action which occurs prior to the dragging and dropping of a node to a final positions in the hierarchy. Once these hierarchy changes are entered by a user, an approving user reviews the change log in order to determine whether or not the requested user change can be finalized.

Change logs can be consolidated using a record consolidation algorithm to remove intermediate action change logs. The removal of these intermediate action change logs can produce a consolidated view of a change log. The consolidated view can reflect those changes which have been approved.

Figure 1:
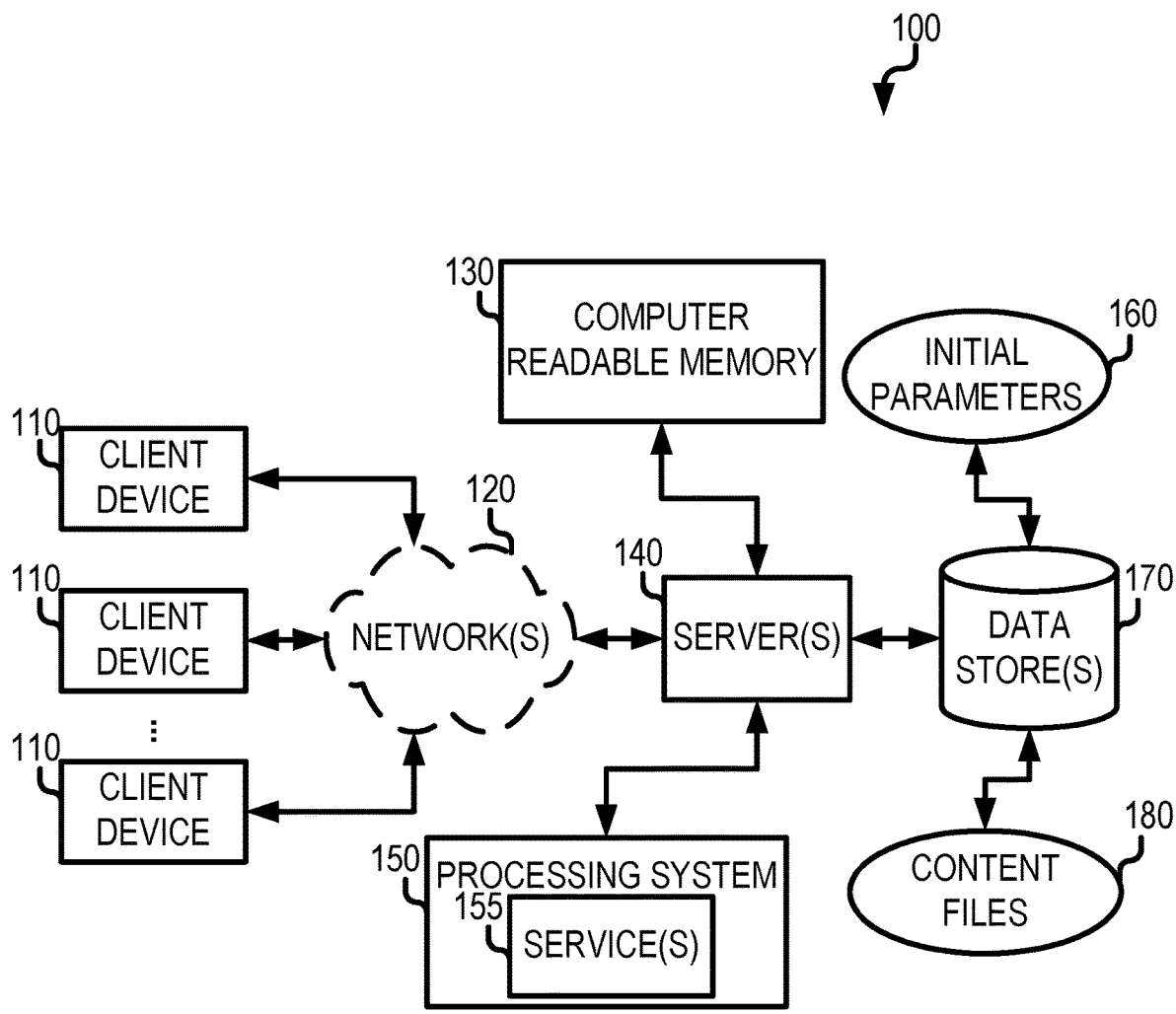
FIG. 1 is a diagram of an example implementation system of a client-server architecture.

FIG. 1 is a diagram of an example implementation system 100 of a client-server architecture. One or more client devices 110 access one or more servers 140 running one or more services 155 on a processing system 150 via one or more networks 120. Alternatively, client device 110 and server 140 can be the same computing device eliminating the need for network 120. One or more servers 140 can access computer-readable memory 130 as well as one or more data stores 170. One or more data stores 170 can include initial parameters 160 as well as content files 180.

Figure 2:
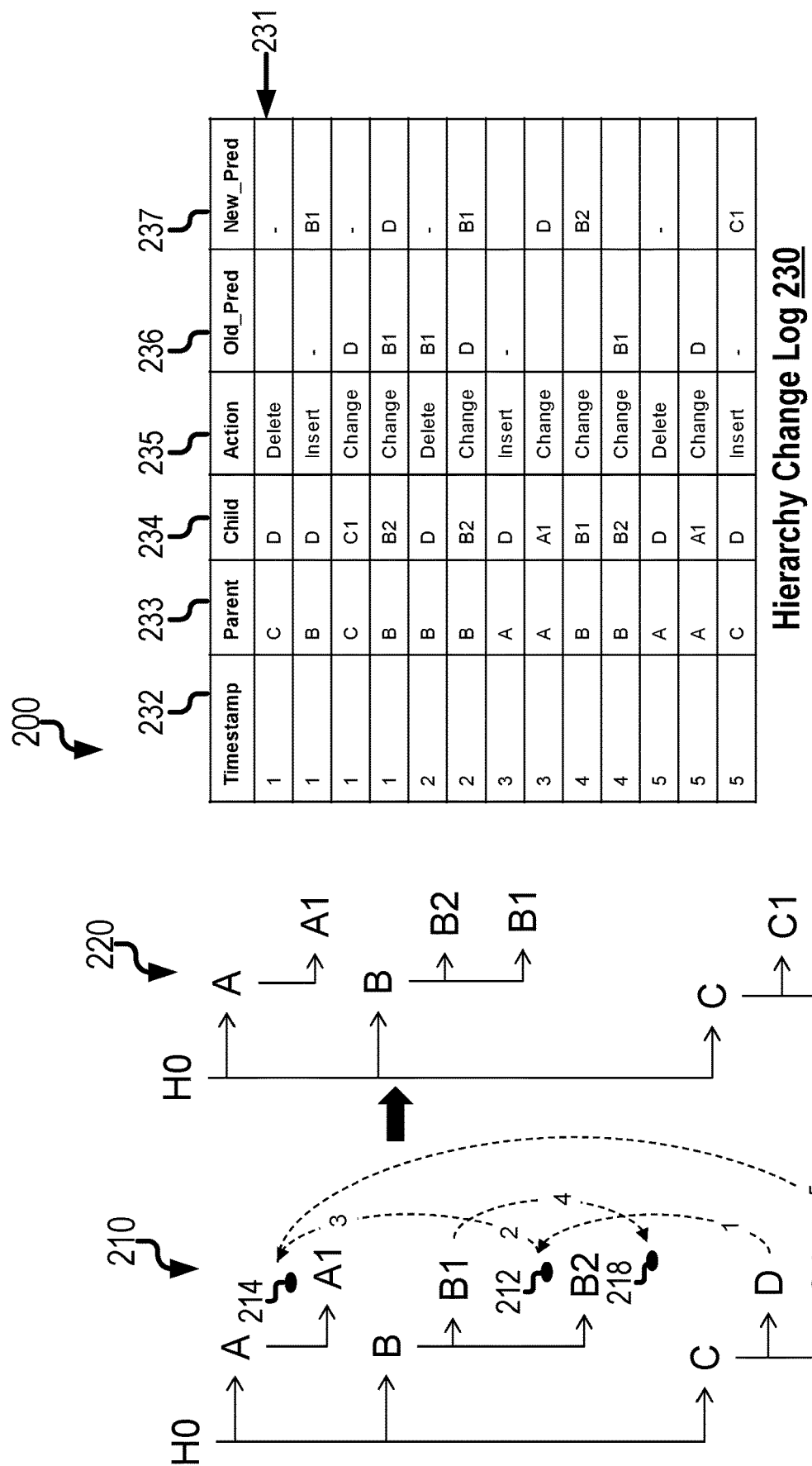
FIG. 2 is an example hierarchical computation process with a hierarchical data structure, a modified hierarchical data structure, and a corresponding hierarchy change log.

FIG. 2 is an example hierarchical computation process 200 including hierarchical data structure 210, modified hierarchical data structure 220, and corresponding hierarchy change log 230. Hierarchy change log 230 can include change records (i.e., 231) made to hierarchal data. Each change record includes hierarchically arranged groups of entries, where each group of entries may contain data such as timestamp 232, parent node 233, child node 234, change action 235, old predecessor to child node 236, and new predecessor to child node 237. The groups of entries may be hierarchically arranged in a timely sequence, according to their time stamps 232. Change action 235 specifies the type of change made to hierarchal data. For example, type of change can include inserting a new node, deleting a node, modifying a node, moving a node to depend from a different parent node, or moving a node to have a different child node.

Hierarchical data satructure 210 has an overall hierarchy structure designated H0. Nodes A, A1, B, B1, B2, C, C1, and D can be hierarchically arranged nodes of hierarchical data structure 210. Nodes D and C1, for example, can be child nodes of parent node C. In order to rearrange child nodes D and C1 such that child node D is positioned below child node C1, multiple user interactions of D to intermediate parking positions can occur in order to move D from an initial location to a final location. For example, child node D can first be moved along path 1 to parking position 212 which action is logged as several consecutive intermediate steps. Firstly, at timestamp 232 indicated as '1', a corresponding change record 231 is created indicating that child node 235 of 'D' was deleted from parent node 234 of 'C'. Accordingly, an action 236 of 'Delete' is logged in change record 231, with no old predecessor 236 for child node 235 of 'D' or no new predecessor 237 for the same child node. Secondly, it is recorded that node D is newly added as a child to parent node B, where node D is arranged hierarchically between two child nodes of parent node B, i.e. below child node B1 and above child node B2. As a result, for the newly added D node to parent node B, another change record is created corresponding to the same timestamp 232 of '1' annotating parent node 233 as 'B', child node 234 as 'D', and an action of 'Insert'. Additionally, it is recorded in the same change record that child node D receives the new predecessor 237 of 'B1'. Two additional change records 231 are created for the moving of node D to parking position 212, again with the same time stamp as the first two change records. Child node B2 is changed to have new predecessor 237 of 'D'. Child node C1 is changed as it no longer has a predecessor value annotated by a 'null' for new predecessor 237.

Node D can be moved from parent node B to its next intermediary parking position 214 under parent node A following path 3. Removal of node D can occur at timestamp 232 annotated as '2'. Change records 231 are created corresponding to the deletion of node D from parent node B. Moving node D to parking position 214 also creates corresponding change records 231 at timestamp '3' for the insertion of node D above node A1 and the change in predecessor corresponding to node A1. Prior to moving node D to a final parking position 216, node B1 can be arranged to intermediate parking position 218. Moving node B1 to intermediate parking position 218 creates corresponding change records 231 at timestamp 232 of '4' annotating the changed predecessor values of both nodes B1 and B2.

Node D can be moved from intermediate parking position 214 to its final parking position 216 along path 5. In moving node D, change records 231 can be created at timestamp 232 of '5' annotating the deletion of node D from parent node A, the change of node A1 to no longer having a predecessor value, and the insert of node D into parent node C. Modified hierarchical data structure 220 can include hierarchically arranged nodes in a modified arrangement from hierarchical data structure 210.

FIG. 3 is an example record consolidation algorithm 300. The hierarchy change log can be grouped by a key. The key can be a combination of an identification of a parent node 233 and an identification of a child node 234, where the change records 231 can be first grouped based on a common child node 234 and then based on a common parent node 233. The consolidation rules can be applied to each group of grouped change records individually. A group can contain change records having the same key. Each group can belong to a different pair of parent and child nodes which are affected by the change records. The record consolidation algorithm 200 cancels out change records having changes that offset each other.

Each group can be sorted by timestamp in an ascending order. The hierarchy change log can then be consolidated. For example, a first record t1 can be merged with a next record t2. The records t1 and t2 can be merged using the rules outlined in algorithm 200. For example, a first rule holds if a first change record describes deletion of a first predecessor node to the child and the second change record describes insertion of a second predecessor node to the child, and the first and second predecessor nodes are the same, then the first and second change records can be removed from the change log. The consolidation continues on to the third and fourth change record for this group. If a first change record describes deletion of a first predecessor node to the child and the second change record describes insertion of a second predecessor node to the child, and the first and second predecessor nodes are not the same, then the first change record and the second change record can be merged to describe a change with the new predecessor value of the second change record new predecessor value.

A second rule holds if the first change record describes an insert of a first predecessor node to the child and the second change record describes a deletion of the first predecessor node to the child node, then the first and second change records can be removed from the change log. Following a third rule, if the first change record describes an insert of a first predecessor node to the child and the second change record describes a change from no predecessor node to a second predecessor node, then the first change record and second change record can be merged to describe insertion of the second predecessor node to the child node.

A fourth rule holds if the first change record describes a change from no predecessor node to a first predecessor node and the second change record describes insertion of a second predecessor node to the child node, then the first change record and the second change record are merged to describe insertion of the first predecessor node. Following a fifth rule, if the first change record describes a change of a first predecessor node of a child node to a second predecessor node, and the second change record describes a change of a second predecessor node to a first predecessor node, then the first and second change records can be removed from the change log.

A sixth rule holds if the first change record describes a change of a first predecessor node to a second predecessor node and the second change record describes a change from a second predecessor node to a third processor node, then the first change record and second record can be merged to describe a change from a first predecessor node to a third predecessor node. Iteration through the rules can continue until the last record of the group change records in the hierarchy change log are merged.

FIG. 4 is a process flow diagram 400 illustrating grouping and consolidation of hierarchy change logs. Group view 410 can be created by grouping the change data records of hierarchy change log 230 according to a key corresponding to each data record. Grouped view 410 can be consolidated using record consolidation algorithm 300 to create consolidated view 420. Consolidated view 420 can include a reduced number of data records corresponding to the changed data records. Selection of a data record of consolidated view 420 can indicate that the changes characterized by such change record have been approved.

Figure 5:
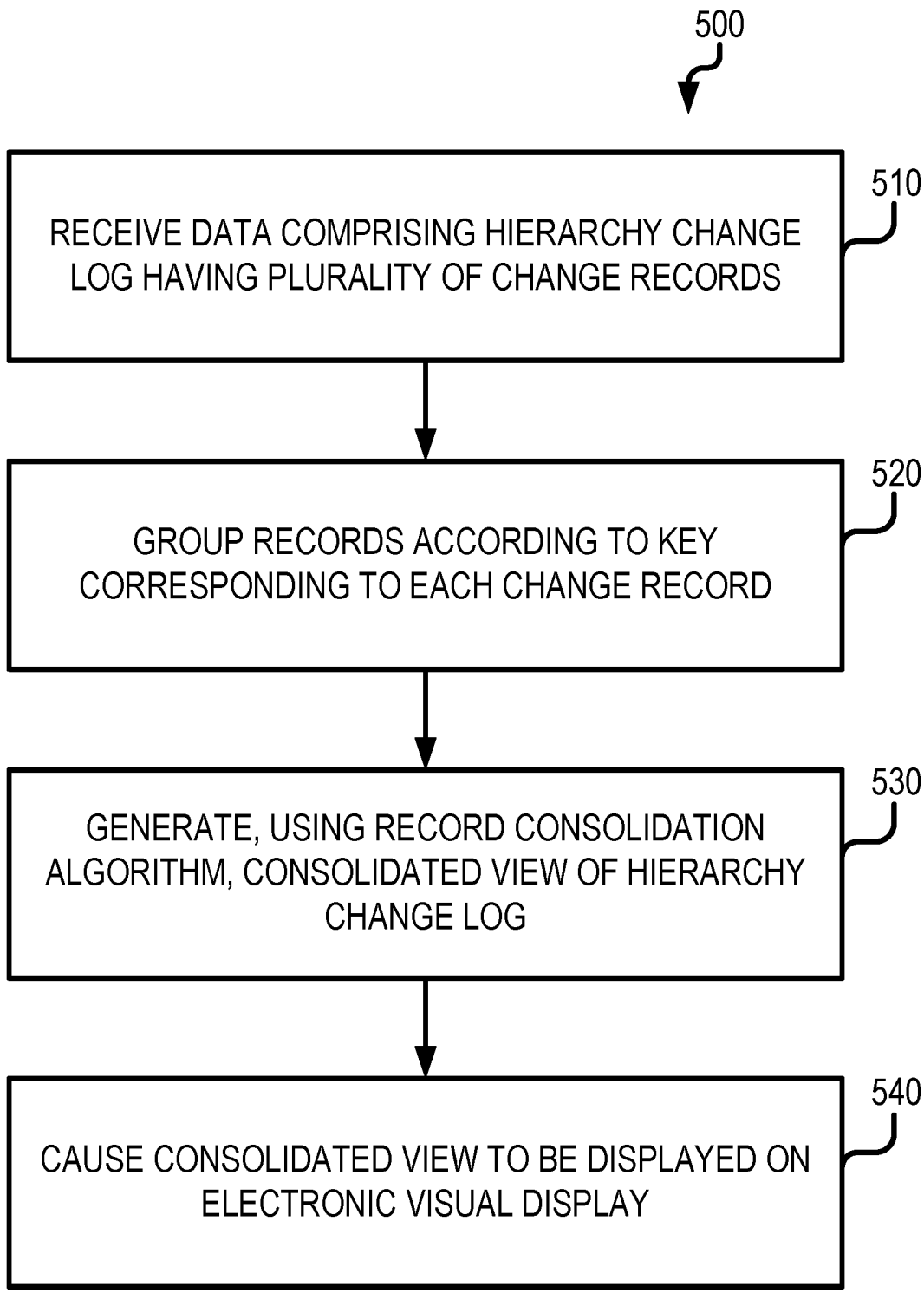
FIG. 5 is a process flow diagram illustrating hierarchical computation.

FIG. 5 is a process flow diagram 500 illustrating hierarchical computation. Data comprising a hierarchy change log having a plurality of change record can be received, at 510. Each change record can specify one of a plurality of changes made to hierarchical data. The hierarchical data can include a plurality of hierarchically arranged nodes.

The records can be grouped, at 520, according to a key corresponding to each record. Using record consolidation algorithm 300, consolidated view 420 of hierarchy change log 230 can be generated, at 530. For example, consolidated view 420 can be generated by sorting the change records (i.e., 231) for each group into an ascending temporal order based on their respective timestamps to form a sequence of change records. Consolidated view 420 can include a reduced number of change records for at least one of the groups of change records.

Consolidated view 420 can be caused, at 540, to be displayed on an electronic visual display. Consolidated view 420 can include graphical user interface elements corresponding to each change record. Selection of the change records can cause an unconsolidated view of the change records for the corresponding key to be displayed. Each change record for each group can be selectively merged in the sequence of change records with an immediately successive change record until such time that only one change record remains for the group. Additionally, each change record in the sequence of change records can be selectively merged with an immediately successive change record until only one change record remains for the group or there are no remaining change records.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, solid-state disks, optical disks, memory, and Programmable Logic Devices (PLDs), used to provide machine instructions and/or data to a programmable data processor. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 6:
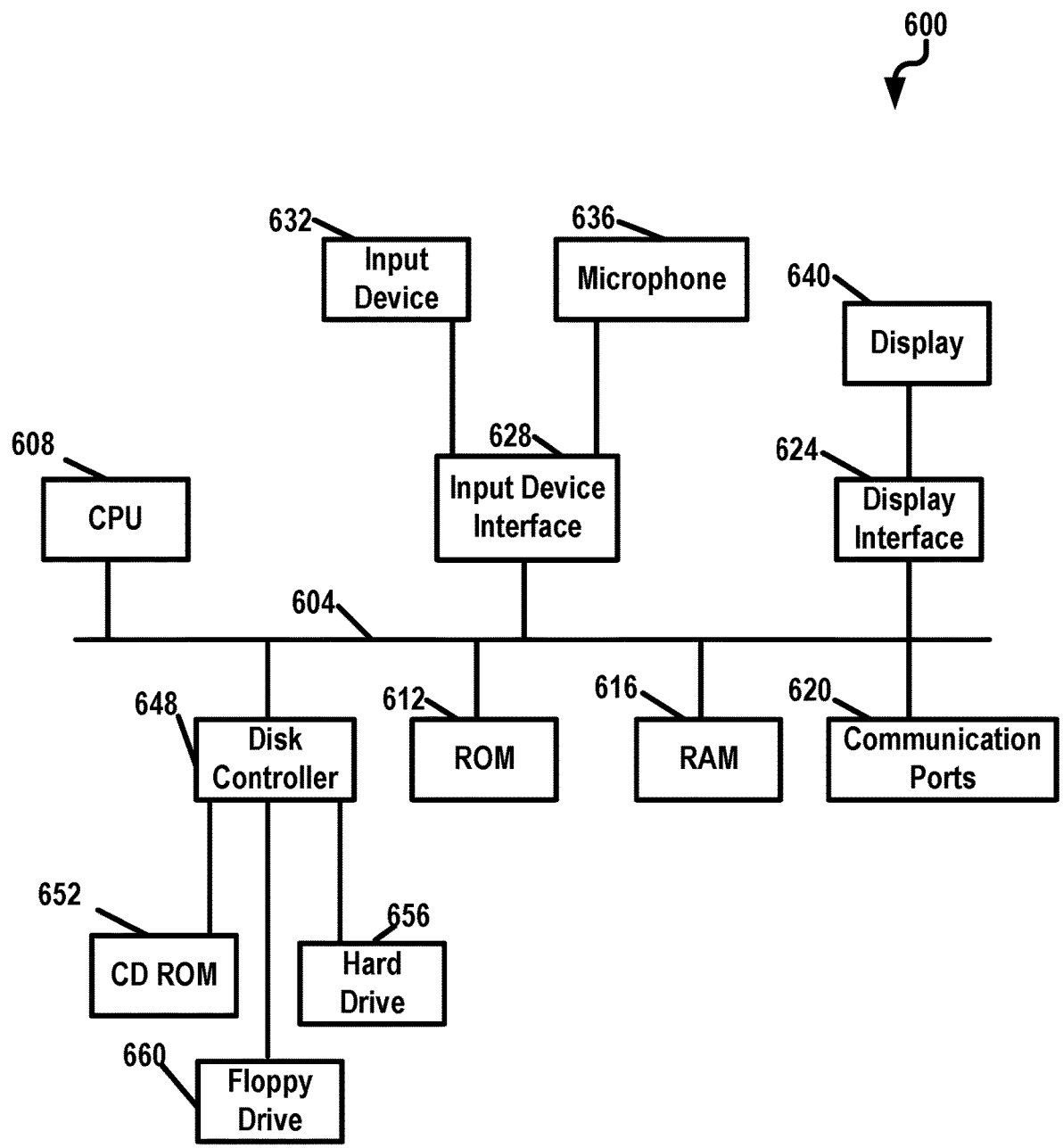
FIG. 6 is a diagram illustrating a sample computing device architecture for implementing various aspects described herein.

FIG. 6 is a diagram 600 illustrating a sample computing device architecture 600 for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 624, the input device 632, the microphone 636, and input device interface 628.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:

receiving hierarchical data comprising a hierarchy change log having a plurality of change records that each specify, in text, (i) a node, (ii) one of a plurality of changes made to the node, (iii) an old predecessor node identifying an old position of the node prior to a change of the plurality of changes, and (iv) a new predecessor node identifying a current position of the node after the change, wherein the hierarchical data comprises a plurality of hierarchically arranged nodes and wherein the plurality of changes comprises at least one of a deletion of the node, an insertion of the node, or a positional change to the node within the plurality of hierarchically arranged nodes;

grouping the plurality of change records according to a key corresponding to each change record;

generating, using a record consolidation algorithm having a plurality of rules, a consolidated view based on the hierarchy change log, the consolidated view comprising a reduced number of change records for at least one of the groups of change records by iterating through the plurality of rules, wherein each rule of the plurality of rules defines a specified change and corresponding merge definition, the merging definition defining which change record of the plurality of change records to modify by updating the old predecessor node or the new predecessor node, wherein the generating comprises sorting, for each group, the change records into an ascending temporal order based on their respective timestamps to form a sequence of change records;

selectively merging, for each group based on the plurality of rules, each change record in the sequence of change records with an immediately successive change record until such time that (i) only one change record remains for the group or (ii) there are no remaining change records; and causing the consolidated view to be displayed on an electronic visual display.

2. The computer-implemented method of claim 1, wherein the key is a combination of an identification of a parent node and an identification of a child node.

3. The computer-implemented method of claim 1, wherein the consolidated view comprises a plurality of graphical user interface elements corresponding to each change record, the selection of which causing an unconsolidated view of the change records for the corresponding key to be displayed.

4. The computer-implemented method of claim 1, wherein the consolidated view comprises a plurality of graphical user interface elements corresponding to each change record, the selection of which indicating that the plurality of changes characterized by such change record have been approved.

5. The computer-implemented method of claim 1, wherein the positional change comprises at least one of moving the node to depend from a different parent node or moving the node to have a different child node.

6. The computer-implemented method of claim 1, wherein the record consolidation algorithm cancels out change records having changes that offset each other.

7. The computer-implemented method of claim 6 further comprising:

selectively merging, for each group based on the plurality of rules, each change record in the sequence of change records with an immediately successive change record until such time that only one change record remains for the group or there are no remaining change records.

8. The computer-implemented method of claim 1, wherein the receiving, grouping, generating, and causing are implemented by at least one data processor forming part of at least one computing system.

9. An article of manufacture comprising:

computer executable instructions stored on non-transitory computer readable media, which, when executed by a computer, causes the computer to perform operations comprising:

receiving hierarchical data comprising a hierarchy change log having a plurality of change records that each specify, in text, (i) a node, (ii) one of a plurality of changes made to the node, (iii) an old predecessor node identifying an old position of the node prior to a change of the plurality of changes, and (iv) a new predecessor node identifying a current position of the node after the change, wherein the hierarchical data comprises a plurality of hierarchically arranged nodes and wherein the plurality of changes comprises at least one of a deletion of the node, an insertion of the node, or a positional change to the node within the plurality of hierarchically arranged nodes;

grouping the plurality of change records according to a key corresponding to each change record;

generating, using a record consolidation algorithm having a plurality of rules, a consolidated view based on the hierarchy change log, the consolidated view comprising a reduced number of change records for at least one of the groups of change records by iterating through the plurality of rules, wherein each rule of the plurality of rules defines a specified change and corresponding merge definition, the merging definition defining which change record of the plurality of change records to modify by updating the old predecessor node or the new predecessor node, wherein the generating comprises sorting, for each group, the change records into an ascending temporal order based on their respective timestamps to form a sequence of change records;

selectively merging, for each group based on the plurality of rules, each change record in the sequence of change records with an immediately successive change record until such time that (i) one change record remains for the group or (ii) there are no remaining change records; and causing the consolidated view to be displayed on an electronic visual display.

10. The article of manufacture of claim 9, wherein the key is a combination of an identification of a parent node and an identification of a child node.

11. The article of manufacture of claim 9, wherein the consolidated view comprises a plurality of graphical user interface elements corresponding to each change record, the selection of which causing an unconsolidated view of the change records for the corresponding key to be displayed.

12. The article of manufacture of claim 9, wherein the consolidated view comprises a plurality of graphical user interface elements corresponding to each change record, the selection of which indicating that the plurality of changes characterized by such change record have been approved.

13. The article of manufacture of claim 9, wherein the positional change comprises at least one of moving the node to depend from a different parent node or moving the node to have a different child node.

14. The article of manufacture of claim 9, wherein the record consolidation algorithm cancels out change records having changes that offset each other.

15. The article of manufacture of claim 14, wherein execution of the computer executable instructions stored on non-transitory computer readable media causes the computer to perform operations further comprising:

selectively merging, for each group based on the plurality of rules, each change record in the sequence of change records with an immediately successive change record until such time that only one change record remains for the group or there are no remaining change records.

16. A system comprising:

a computer;

non-transitory computer readable media;

computer executable instructions stored on the non-transitory computer readable media, which, when executed by the computer, causes the computer to perform operations comprising:

receiving hierarchical data comprising a hierarchy change log having a plurality of change records that each specify, in text, (i) a node, (ii) one of a plurality of changes made to the node, (iii) an old predecessor node identifying an old position of the node prior to a change of the plurality of changes, and (iv) a new predecessor node identifying a current position of the node after the change, wherein the hierarchical data comprises a plurality of hierarchically arranged nodes and wherein the plurality of changes comprises at least one of a deletion of the node, an insertion of the node, or a positional change to the node within the plurality of hierarchically arranged nodes;

grouping the plurality of change records according to a key corresponding to each change record;

generating, using a record consolidation algorithm having a plurality of rules, a consolidated view based on the hierarchy change log, the consolidated view comprising a reduced number of change records for at least one of the groups of change records by iterating through the plurality of rules, wherein each rule of the plurality of rules defines a specified change and corresponding merge definition, the merging definition defining which change record of the plurality of change records to modify by updating the old predecessor node or the new predecessor node, wherein the generating comprises sorting, for each group, the change records into an ascending temporal order based on their respective timestamps to form a sequence of change records;

selectively merging, for each group based on the plurality of rules, each change record in the sequence of change records with an immediately successive change record until such time that (i) only one change record remains for the group or (ii) there are no remaining change records; and causing the consolidated view to be displayed on an electronic visual display.

\* \* \* \* \*